US005517344A

United States Patent [19]
Hu et al.

[11] Patent Number: 5,517,344
[45] Date of Patent: May 14, 1996

[54] SYSTEM FOR PROTECTION OF DRIVE CIRCUITS FORMED ON A SUBSTRATE OF A LIQUID CRYSTAL DISPLAY

[75] Inventors: Dyi-chung Hu; Sywe N. Lee, both of Taipei; Jessica Lan, Shinchu, all of Taiwan

[73] Assignee: Prime View HK Limited, Kowloon, Rep. of Korea

[21] Appl. No.: 247,141

[22] Filed: May 20, 1994

[51] Int. Cl.⁶ .................. G02F 1/1345; G02F 1/1339
[52] U.S. Cl. ........................................ 359/08; 359/88
[58] Field of Search ............................. 359/88, 80

[56] References Cited

U.S. PATENT DOCUMENTS

| | | | |
|---|---|---|---|
| 3,882,349 | 5/1975 | Holz et al. | 313/519 |
| 4,138,626 | 2/1979 | Unotoro et al. | 315/169.4 |
| 4,394,067 | 7/1983 | Spruijt et al. | 350/334 |
| 4,401,537 | 8/1983 | Chern et al. | 204/159.11 |
| 4,431,270 | 2/1984 | Funada et al. | 350/332 |
| 4,586,789 | 5/1986 | Kishimoto et al. | 350/336 |
| 4,629,942 | 12/1986 | Horio et al. | 315/169.4 |
| 4,810,061 | 3/1989 | Nakanowatari et al. | 350/334 |
| 4,826,297 | 5/1989 | Kubo et al. | 350/339 R |
| 4,836,651 | 6/1989 | Anderson | 350/334 |
| 4,896,946 | 1/1990 | Zizuki et al. | 350/336 |
| 4,917,466 | 4/1990 | Nakamura et al. | 350/336 |
| 5,076,667 | 12/1991 | Stewart et al. | 359/54 |
| 5,130,832 | 7/1992 | Kawaguchi et al. | 359/87 |
| 5,133,036 | 7/1992 | Törnquist | 385/130 |
| 5,148,301 | 9/1992 | Sawatsubashi et al. | 359/80 |
| 5,179,460 | 1/1993 | Hinata et al. | 359/88 |
| 5,202,778 | 4/1993 | Niki | 359/54 |
| 5,233,451 | 8/1993 | Iguchi | 359/62 |
| 5,233,452 | 8/1993 | Iguchi | 359/88 |
| 5,349,226 | 9/1994 | Kawaguchi et al. | 359/88 |

FOREIGN PATENT DOCUMENTS

| | | | |
|---|---|---|---|
| 0267688 | 5/1988 | European Pat. Off. | 359/88 |
| 3-107127 | 5/1991 | Japan | 359/88 |
| 4-50819 | 2/1992 | Japan | 359/88 |

Primary Examiner—William L. Sikes
Assistant Examiner—Charles Miller
Attorney, Agent, or Firm—Jones, Day, Reavis & Pogue

[57] ABSTRACT

Separate circuit sections of active driver circuits located adjacent at least one side of a liquid crystal display have a first encapsulating material covering each of the active driver circuits separately and a second encapsulating material covering all of the active driver circuits and their first encapsulating layer. The active driver circuits may also be sealed between two spaced bands forming an enclosure between the substrates and having an opening in the outer seal to allow a fluid to be inserted in the enclosure formed by the two seal bands to protect the active driver circuits therein. The opening may be sealed with an adhesive.

14 Claims, 2 Drawing Sheets

SYSTEM FOR PROTECTION OF DRIVE CIRCUITS FORMED ON A SUBSTRATE OF A LIQUID CRYSTAL DISPLAY

FIELD OF THE INVENTION

The present invention relates in general to liquid crystal display devices and specifically relates to a system for protection of a circuit device that includes active electronic devices formed on a substrate. The active electronic devices may be a driver circuit for the liquid crystal display.

BACKGROUND OF THE INVENTION

It is necessary to protect integrated circuitry from environmental damage. This is usually done by encapsulation. It is well known in liquid crystal display (LCD) applications that the drive circuits are being placed physically on the liquid crystal display substrates along with the LCD circuit to reduce the number of interconnections and the cost. When these elongated active circuits are placed upon the substrate of the liquid crystal display, stress generated by encapsulation materials and processes may cause cracking or damage to the underlying substrate.

The substrates may be of a type such as glass, ceramic, silicon and the like. Even though the integrated circuits on the substrates are protected by a layer of passivation such as silicon dioxide or silicon nitride, moisture can penetrate through the passivation barrier gradually over a period of time. This can cause high leakage current and leads to performance degradation. Hence, adequate protection of these circuits on a substrate with encapsulation is necessary for a reliable display. It would be advantageous to provide some method and apparatus that not only protected the circuitry but also did not damage the underlying substrate.

Good encapsulation material of a circuit on a substrate such as glass has several requirements. First, the materials should have good adhesion to the substrate. Second, the coefficient of thermal expansion should be close to the underlying substrate. Third, the material should have a low curing temperature, preferably less than 100° C. Fourth, it should have a low alkaline content. Fifth, it must be resistive to moisture attack. Sixth, it must have provided low stress to the underlying circuitry.

It is very difficult for a commercially available encapsulation material to satisfy all of these demands.

The conventional LCD panel packaging is shown in FIG. 1 and is designated generally by the numeral 10. Driver circuit 11 is on substrate 13, which may be a substrate such as glass, and is adjacent the upper substrate 14 which is spaced from the lower substrate 13 and has a well-known seal band 12 between the substrates 13 and 14 to seal the liquid crystal 18 therein between the two substrates 13 and 14 to form a liquid crystal display panel 10. The driver circuit 11 is covered with a protective encapsulation polymer 16 which may be for example Amicon ME1000 which has good adhesion to glass. However, when this material is applied to a glass substrate, such as Corning 7059 glass, with conventional methods, it generally generates cracks in the glass substrate 13. Other encapsulation materials could be used such as Dow Corning JCR 6100 that have low stress applied to the substrate; however, such material delaminates easily from the substrate.

It would be advantageous to encapsulate the integrated driver circuits on a substrate with a protective material in such a way as to not only protect the integrated circuits from environmental damage such as moisture penetration but also to protect the glass substrate from cracking.

SUMMARY OF THE INVENTION

Thus the present invention overcomes the disadvantages of the prior art by providing a circuit containing active devices on a circuit bearing substrate that can be made of glass, ceramic, or silicon and the like in which the patterns of the circuits on the substrate can be arranged such that they are in sections and physically separated from each other. Since $S \alpha \Delta E \times L$, where S=the stress generated in the substrate, $\Delta E$=the difference in the Thermal coefficient of expansion of the substrate and the polymer and L=the length of the circuit section, it is clear that the smaller the length, L, of the circuit, the less the stress generated in the substrate. Each circuit section is encapsulated with two layers of polymer. The inner layer is applied on top of each separate circuit by a dispenser with a process known as tape automated bonding (TAB) encapsulation. Since stress in the substrate is also proportional to the thickness of the inner layer polymer, the inner layer should be made as thin as possible while still providing optimum circuit protection. "Thin" coatings also adhere to the substrate better than "thick" coatings. To further enhance the protection of the circuit, the second outer layer polymer is applied on top of the inner layer polymer over all of the separate circuits to cover any "pinholes" in the inner layer and to provide better moisture protection. This encapsulation material can be of a type that causes little stress in the substrate.

In an alternate embodiment, the circuitry can be protected through the use of a double seal structure. In this structure, the circuitry is located between the two substrates and is sealed with a sealing band on either side thereof. Thus the circuitry is protected by using a double seal structure. During the process of applying the liquid crystal sealing band with a dispenser or by screen printing on the substrates, the second seal band can be made at the same time on the outside of the circuitry. Thus the circuitry would be located in between the two seal bands. If desired, the sealed space can be filled with an inert gas or an insulating fluid. Inert fluids such as silicon oil can be used. Further, to protect the circuit from light, a dark fluid can be fed into the sealed space through a gap left between the plates. Such dark fluid could be formed, for example, with a silicon oil containing opaque pigments or a dye. The space inside the two sealed bands is sealably closed with a well-known adhesive such as UV glue to enclose the gas or fluid inside.

Thus it is an object of the present invention to provide an active circuit on a circuit bearing substrate that can be protected by using polymer encapsulation materials.

It is still another object of the present invention to form the substrate of glass and provide patterns of circuits on the glass that can be arranged such that they are in separate groups and not physically connected with each other and wherein the length, L, of each separate section is such than an encapsulation polymer placed thereon will cause an acceptable stress, S, in the substrate in accordance with the equation $S \alpha \Delta E \times L$ where $\Delta E$=the difference in the Thermal coefficient of expansion of the substrate and the polymer.

It is still another object of the present invention to provide a polymer that can be used for encapsulation that can be dispensed or screen printed over the circuits.

It is yet another object of the present invention to provide a second polymer on the top of the inner layer polymer to enhance circuit protection.

It is also another object of the present invention to provide an alternate method of encapsulating an integrated driver circuit by providing a double seal between opposing substrates with the integrated driver circuit in between both the double seal and the two opposing substrates.

It is also an object of the present invention to provide an inert gas or low viscous inert fluid in the space between the double seals and the two substrates to protect the integrated driver circuits.

Thus the present invention relates to a system for protection of active integrated driver circuits for a liquid crystal display device formed on a substrate, the system comprising a plurality of circuit sections forming each of the active integrated driver devices formed on one substrate adjacent to the liquid crystal display, a first protective coating material separately covering and encapsulating each circuit section forming the plurality of integrated driver circuits, the first protective coating adhering to the substrate for protecting the active integrated driver circuits, and a second outer protective coating material covering and encapsulating each of said first protective coatings to enhance protection of the integrated driver circuits.

BRIEF DESCRIPTION OF THE DRAWINGS

These and other objects of the present invention will be more fully disclosed when taken in conjunction with following detailed description of the drawings in which like numerals represent like elements and in which.

DETAILED DESCRIPTION OF THE INVENTION

Figure 1:
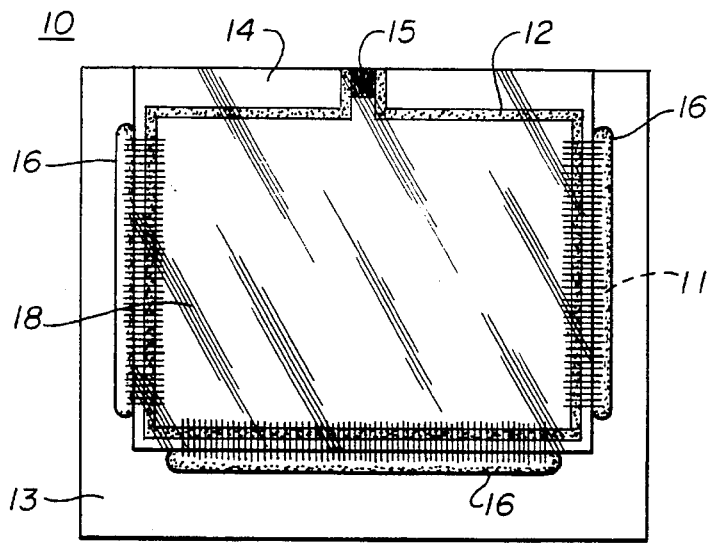
FIG. 1 is a diagrammatic representation of the prior art encapsulation of active drive circuits on a substrate.

As stated earlier, FIG. 1 is a diagrammatic representation of a conventional encapsulation of active drive circuits on a substrate. The LCD panel package 10 includes an elongated active driver circuit 11 on the substrate 13 adjacent the LCD display 18 which is sandwiched between substrates 13 and 14. "Active" driver circuits are defined herein as both data and scan driver devices such as transistor, diodes and the like as opposed to passive devices such as resistors, capacitors and inductors. The elongated active driver circuits 11 are shown formed on three sides of the LCD display 18 in FIG. 1. A liquid crystal seal band 12 surrounds the liquid crystal display 18 between the upper and lower substrates 13 and 14 to contain the liquid crystal therein. An opening therein is blocked by a well-known adhesive 15 such as UV glue after the liquid crystal is inserted therein. An encapsulation polymer 16 covers each of the three elongated active driver circuits 11. The active driver circuits 11 may be both column and row driver circuits. One type of epoxy used for such encapsulation polymer 16 is Amicon ME1000 which has good adhesion to glass. However, when this material is applied with conventional methods to a glass substrate 13, such as Corning 7059 glass, it generates cracks in the glass substrate 13. Other materials could be used for encapsulation, such as Dow Corning JCR 6100 that applies low stress to the substrate; however, it delaminates easily from the substrate.

Figure 2:
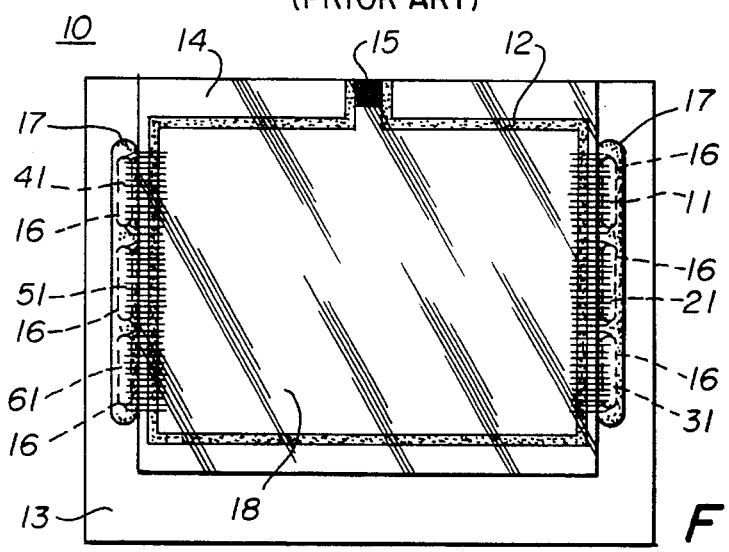
FIG. 2 is a diagrammatic arrangement of the present invention illustrating the separation of the active drive circuits into circuit sections for encapsulation of the circuit sections on the substrates.

FIG. 2 is a diagrammatic representation of the present invention that provides protection for the active driver circuitry on the glass substrate. As can be seen in FIG. 2, the active driver circuit on the right hand side of the display 18 has been formed or arranged in separate sections 11, 21 and 31. On the left hand side of the display 18 the active driver circuits have been divided or formed into sections 41, 51 and 61. These sections may be unevenly spaced with respect to each other if desired. An encapsulation material with good adhesion to the glass, even though it has high stress applied to the glass, for example Amicon ME1000, can be used in this case because it has been advantageously discovered that the separation of the driving circuit into a plurality of smaller units with a separate protective covering for each unit reduces stress in the substrate. As pointed out earlier, the stress, S, in the substrate is determined by the equation $S \alpha \Delta E \times L$. Thus as the length, L, of a circuit section is decreased, the difference in the thermal coefficient of expansion, $\Delta E$, between the substrate and the encapsulation polymer causes less total stress, S, on the substrate. The distance, L, can then be determined to be that length which reduces the stress level, S, to an acceptable amount. Uneven spacing of the sections may help prevent the stress from becoming concentrated in any particular area. Each of the circuit sections 11, 21 and 31 and 41, 51 and 61 are covered or encapsulated separately by a protective coating 16. It will be noted that these protective coatings 16 are separated from each other. Hence, the stress applied to the substrate is substantially less than that of the prior art as shown in FIG. 1 because of the stress relationship set forth in the above equation. The thickness of the protective coating 16 can be made as thin as practical to reduce stress even further since stress, S, is also proportional to the coating thickness. The thickness, T, of the coating should be reduced to that minimum thickness which will provide an acceptable protection of the active circuit sections. Thus, this novel system protects the substrate 13 and significantly reduces the cracking of the substrate.

This inner layer polymer 16 can be applied on top of the circuit sections 11, 21 and 31 and 41, 51 and 61 by a dispenser. The dispensing process is a tape automated bonding (TAB) chip encapsulation method that is well known in the art.

To enhance protection of the circuit sections 11, 21, 31, 41, 51 and 61, a second outer layer polymer 17 can be applied to them on top of the inner layer polymer 16 either in a continuous layer as shown or as a separate layer for each circuit section. This second layer can cover "pinholes" in the inner layer and improve moisture resistance of the encapsulation. Thus with the system as illustrated in FIG. 2, the material used for encapsulation has good adhesion to glass, it has a coefficient of thermal expansion close to the underlying glass, it has a low curing temperature, preferably less than 100° C., it has a low alkaline content, it is resistant to moisture attack, and it creates low stress in the underlying circuitry and substrate.

Figure 3:
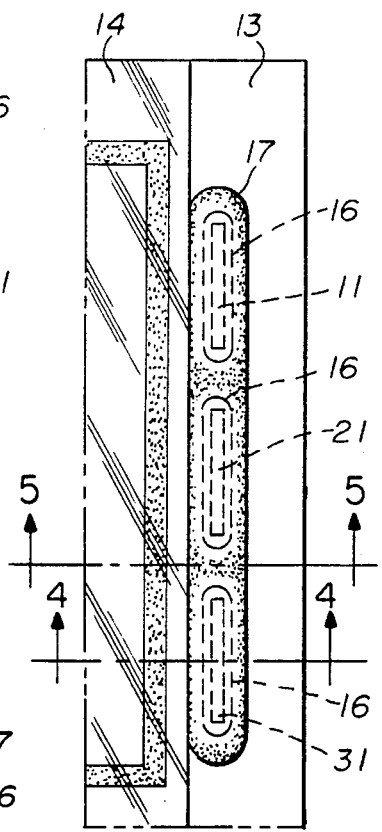
FIG. 3 is an enlarged representation of one of the active driver circuits formed in separate sections in FIG. 2 with both encapsulation materials thereon.
Figure 4:
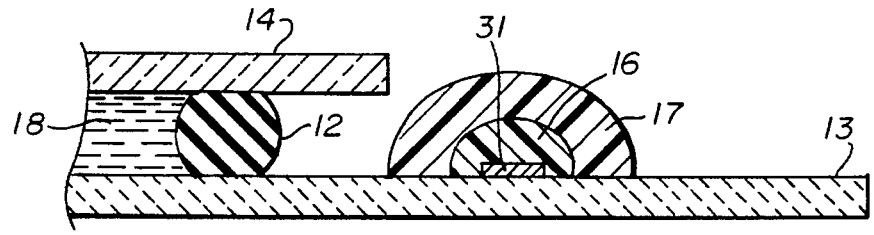
FIG. 4 is a cross-sectional view of FIG. 3 taken along lines 4—4.

FIG. 3 is an enlarged version of the encapsulated active drive circuits adjacent the display 18 as shown in FIG. 2. As can be seen therein each of the circuit sections 11, 21 and 31 are separately and individually covered by the first layer of encapsulation material 16. All three of those separate layers of encapsulation material 16 are shown covered by a common continuous second layer of encapsulation material 17. If desired, however, each circuit section and its first layer of encapsulation material 16 may be separately covered by the second layer of encapsulation material 17. This can be seen more clearly in FIG. 4 which is a cross-sectional view of FIG. 3 taken along lines 4—4 and includes a portion of display 18 shown in FIG. 2. As can be seen in FIG. 4, the active driver circuit section 31 is integrally formed on the substrate 13 adjacent the liquid crystal display 18 which is between the two substrates 13 and 14 and sealed therein with the liquid crystal seal band 12. The first layer of encapsulation material 16 is formed over only the circuit section 31 and then the second encapsulating layer 17 is formed over the first layer 16. As will be noted in FIG. 3, and as stated previously, each of the circuit sections 11, 21 and 31 are separately and individually covered with the first encapsulation material 16. However, the second encapsulation layer 17, the outer layer, may extend continuously over all of the three inner layers 16 as shown in FIG. 3 because it does not harm the substrate but seals imperfections in the first layer of encapsulation material 16.

Figure 5:
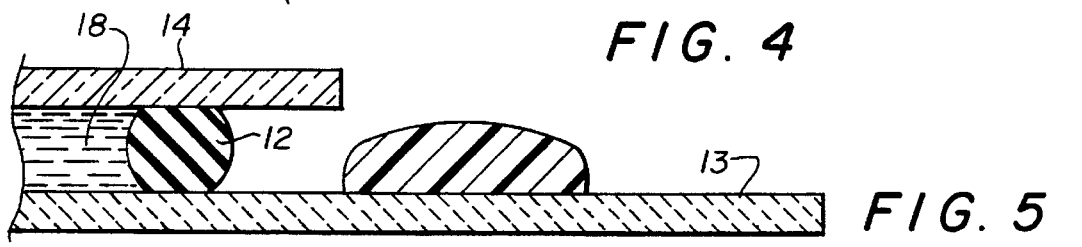
FIG. 5 is a cross-sectional view of FIG. 3 taken along lines 5—5.

FIG. 5 is a cross-sectional view of FIG. 3 taken along lines 5—5 and illustrates that the second layer 17 is continuous across the substrate 13 in between the individual circuit sections 11, 21 and 31 and their individual encapsulation materials 16. Thus with the system shown in FIGS. 2, 3, 4 and 5, the formation of separate unconnected sections of active driving circuits 11, 21 and 31 with the first layer of encapsulation material applied to each of those circuit sections individually allows the use of a very thin encapsulation layer that has very good adhesion to glass, a coefficient of thermal expansion close to the underlying glass, a low curing temperature that is less than 100° C., a low alkaline content, resistant to moisture attack and advantageously and unexpectedly provides low stress to the circuitry and the substrate because of the formation of the active drive circuits into n separate sections. The sections can then be covered with the continuous second layer of material that seals any pin holes or other imperfections in the first layer of material 16.

Figure 6:
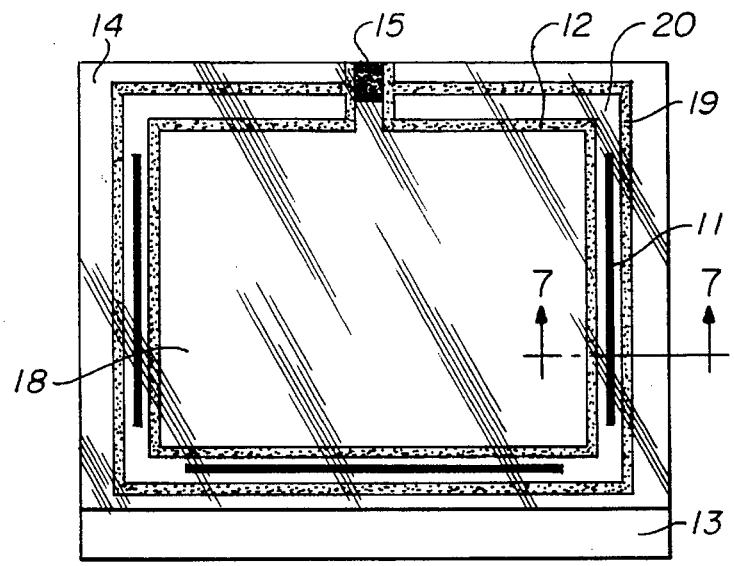
FIG. 6 is a diagrammatic representation of an alternate embodiment of the present invention illustrating a double seal band structure for protecting the active drive circuits on the substrate.
Figure 7:
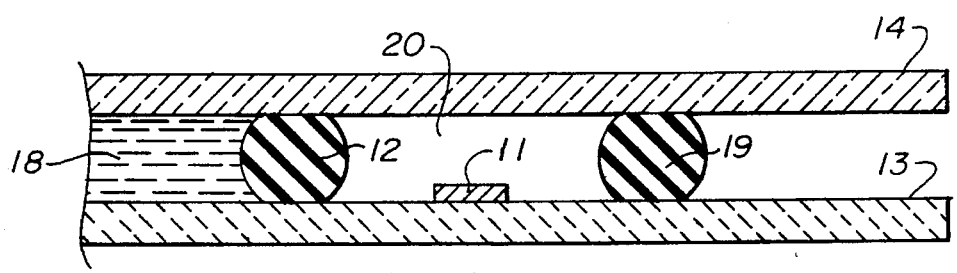
FIG. 7 is a cross-sectional view taken along lines 7—7 of FIG. 6.

An alternate system for protecting the circuitry is shown in FIG. 6 and FIG. 7. In FIG. 6, again the elongated driver circuitry 11, shown in illustrative form only, is applied to substrate 13 adjacent to and on the outside of the liquid crystal display 18 and seal band 12. In this case, a second seal band 19 can be applied to the substrate 13 when applying the first liquid crystal seal band 12 either by dispenser or screen printing as discussed earlier. There are several possible patterns that could be used to seal the active driver circuit 11. As can be seen in FIG. 6, and more particularly in FIG. 7, which is a cross section of FIG. 6 taken along lines 7—7, the active drive circuitry 11 is integrally formed on the substrate 13 between the two sealing bands 12 and 19 and between upper and lower substrates 13 and 14. This provides a total seal for the circuitry 11 thus protecting it from the environment. In such case, there is no need for a sealing or encapsulating layer to be placed over the circuitry 11. Neither is it necessary to separate the circuitry 11 into a plurality of smaller circuit sections.

Figure 8:
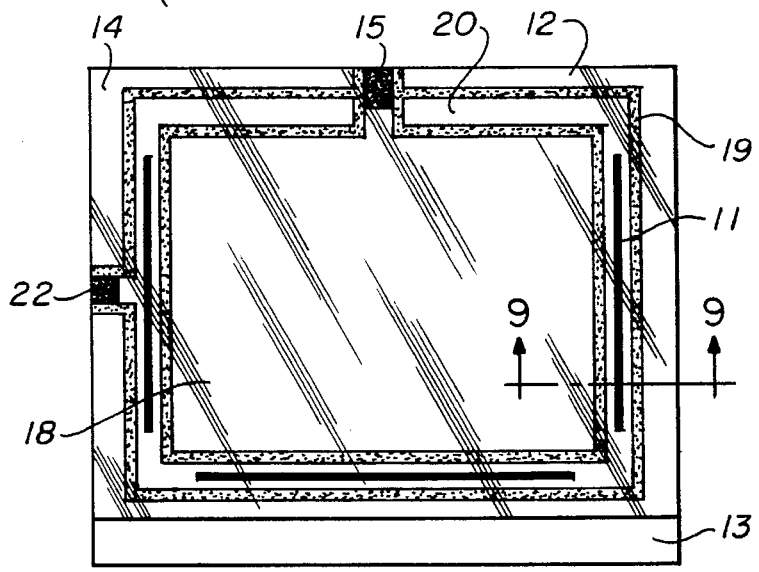
FIG. 8 is a diagrammatic representation of a second alternative type of double seal band structure of the present invention.
Figure 9:
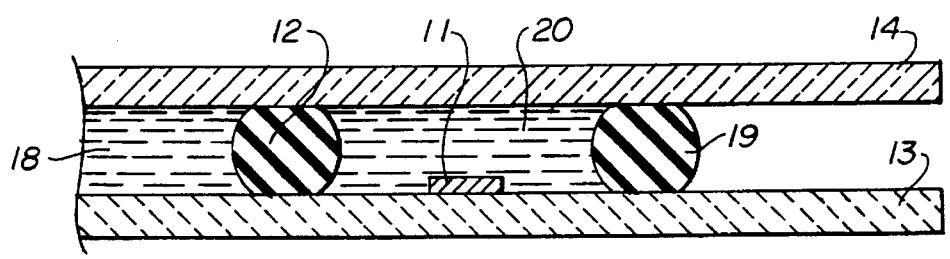
FIG. 9 is a cross sectional view of FIG. 8 taken along lines 9—9.

Still another embodiment of the arrangement illustrated in FIG. 6 is shown in FIG. 8 and FIG. 9. In this case, the outer seal band 19 has an opening with an adhesive 22 therein to close the chamber formed by the sealing bands 12 and 19 and the substrates 13 and 14. Prior to inserting the adhesive 22 in the opening, the enclosure 20 that is formed by the seal bands 12 and 19 and the substrates 13 and 14 can be filled with inert gas or an insulating fluid. An inert fluid such as silicon oil could be used. Further, to protect the circuit from light, if necessary, a dark fluid such as, for example only, silicon oil with appropriate pigments or dyes, can be inserted into the hollow housing or enclosure 20. Thus the liquid crystal is supplied to the liquid crystal display panel 18 through an opening that is then closed with an adhesive 15 and the inert gas or insulating fluid is inserted in the hollow housing or enclosure 20 and then adhesive 22 inserted therein. Clearly in this case, the circuits are totally isolated from the environment and there is no need for an encapsulation material to be placed thereon that might cause any stress in either the circuit or the substrate. Thus it is not necessary to divide the active driver circuits into smaller circuit sections as illustrated in FIGS. 2 and 3.

Thus there has been disclosed a novel apparatus for protecting active driver circuits on a substrate such as glass. The patterns of the driver circuits are arranged on the substrates such that they are in separate circuit sections, with even or uneven spacing, and are not physically connected to each other. A first polymer layer is used for encapsulation and can be applied to each separate circuit section either by a dispenser or screen printing, both of which are well known. The second encapsulation layer may be a second polymer that can be applied in a continuous manner to the top of the inner layer polymer to enhance circuit protection.

In still another embodiment, the driver circuit is encompassed in an enclosure formed between spaced seals and between the upper and lower substrates. If desired, an inert gas and low viscous inert fluid can be inserted into the enclosure that is formed that includes the circuit therein.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A system for protection of a liquid crystal display device having a display area and that includes active driver circuits integrally formed on a first substrate, the system including:

n separate spaced circuit sections forming the active driver circuits, each of said n spaced circuit sections being formed on the first substrate adjacent at least one side of the display area of the liquid crystal display;

a first protective coating material separately covering and encapsulating each of the n circuit sections of said active driver circuits, said first protective coating adhering to the first substrate for protecting the active driver circuits; and a second outer protective coating material continuously covering and encapsulating all of the n circuit sections of said active driver circuits to enhance protection of the active driver circuits.

2. A system as in claim 1 wherein:

the first protective coating material is a polymer; and each of said n circuit sections has a length, L, and provides a stress, S, in the substrate where $$S \alpha \Delta E \times L$$

and ΔE=the difference in the thermal coefficient of expansion of the substrate and the polymer.

3. A system as in claim 2 wherein the encapsulation polymer is an epoxy type that is dispensed over the active driver circuits according to a tape automated bonding chip encapsulation process.

4. A system as in claim 2 where in the encapsulation polymer is screen printed over the active driver circuits.

5. A system as in claim 1 wherein the substrate is glass.

6. A system as in claim 1 further including:

a second substrate separated from the first substrate over at least a portion of one of the substrates; and said active driver circuits being on said first substrate but not covered by the second substrate.

7. A system for protection of an active driver circuit integrally formed on one of first and second spaced substrates having a liquid crystal display area, the system including:

at least one elongated active driver circuit formed on the first substrate adjacent the liquid crystal display area;

first and second spaced seals between the first and second spaced substrates to form an enclosure substantially surrounding said display area;

said first seal surrounding and enclosing said liquid crystal display area in a liquid-tight fashion; and said second seal being spaced from said first seal and forming said enclosure with said first seal to seal the at least one elongated active driver circuit in said enclosure formed between said first and second substrates by said first and second spaced seals.

8. A system as in claim 7 further comprising a fluid filling said enclosure in which the at least one elongated active driver circuit is sealed between said first and second spaced substrates and said first and second spaced seals.

9. A system as in claim 8 wherein the fluid is an inert gas.

10. A system as in claim 8 wherein the fluid is a low viscous fluid.

11. A system as in claim 8 wherein the fluid is an opaque fluid to block light.

12. A system as in claim 8 further including:

an opening into one of said seals forming the enclosure sealing the active driving circuit between said first and second substrates for entering said fluid therein; and a glue seal to block said opening after said enclosure has been filled with said fluid to maintain said fluid in said enclosure.

13. A system as in claim 12 wherein said glue is a UV glue.

14. A system as in claim 7 further including:

an opening extending through both of said first and second spaced seals for inserting liquid crystal into said liquid crystal display area; and a seal for closing said opening after the liquid crystal is placed therein.

* * * * *

UNITED STATES PATENT AND TRADEMARK OFFICE
CERTIFICATE OF CORRECTION

PATENT NO. : 5,517,344
DATED : May 14, 1996
INVENTOR(S) : Hu et al.

It is certified that error appears in the above-indentified patent and that said Letters Patent is hereby corrected as shown below:

Title page, item: [75], delete "Dyi-chung" and replace with --Dyi-Chung--; and

Item: [73], delete "Kowloon, Rep. of Korea" and replace with --Kowloon, Hong Kong--.

Signed and Sealed this

Fifth Day of November, 1996

Attest:

BRUCE LEHMAN

Attesting Officer

Commissioner of Patents and Trademarks